United States Patent
Lucchi et al.

(10) Patent No.: US 10,752,446 B2
(45) Date of Patent: Aug. 25, 2020

(54) HYBRID MODULAR BELT

(71) Applicant: Habasit AG, Reinach (CH)

(72) Inventors: Marco Lucchi, Munchenstein (CH); Stefan Simmendinger, Arlesheim (CH); Dietmar Elsner, Eimeldingen (DE); Enrico Visconti, Reinach (CH)

(73) Assignee: Habasit AG, Reinach (CH)

( * ) Notice: Subject to any disclaimer, the term of this patent is extended or adjusted under 35 U.S.C. 154(b) by 69 days.

(21) Appl. No.: 14/866,819

(22) Filed: Sep. 25, 2015

(65) Prior Publication Data

US 2017/0088356 A1 Mar. 30, 2017

(51) Int. Cl.
*B65G 17/40* (2006.01)
*B65G 17/08* (2006.01)
*B65G 17/34* (2006.01)

(52) U.S. Cl.
CPC ............. *B65G 17/40* (2013.01); *B65G 17/08* (2013.01); *B65G 17/34* (2013.01)

(58) Field of Classification Search
CPC ........ B65G 17/34; B65G 17/40; B65G 54/02; B65G 2207/30; B65G 17/067; B65G 17/068; B65G 17/08; B65G 17/083; B65G 17/46
USPC ........................................ 198/850, 851, 853
See application file for complete search history.

(56) References Cited

U.S. PATENT DOCUMENTS

| | | | |
|---|---|---|---|
| 449,464 A * | 3/1891 | Cook | 16/21 |
| 2,114,237 A | 4/1938 | Pink | |
| 2,649,954 A | 8/1953 | Nawman | |
| 2,909,012 A * | 10/1959 | Barnes | B24C 3/26 451/328 |
| 3,785,476 A * | 1/1974 | Poerink | B65G 17/08 198/853 |
| 3,920,117 A | 11/1975 | Roinestad | |
| 3,978,976 A | 9/1976 | Kamp | |
| 4,186,566 A | 2/1980 | AuYoung | |
| 4,476,655 A * | 10/1984 | Ansbaugh | B24C 3/26 451/326 |
| 4,635,788 A | 1/1987 | McDonald | |
| 4,925,013 A * | 5/1990 | Lapeyre | B65G 17/08 198/690.2 |
| 4,934,517 A | 6/1990 | Lapeyre | |
| 5,003,731 A | 4/1991 | Durr | |
| 6,070,715 A | 6/2000 | Etherington | |
| 6,615,979 B2 * | 9/2003 | Etherington | B65G 17/068 198/851 |

(Continued)

FOREIGN PATENT DOCUMENTS

| | | |
|---|---|---|
| GB | 20928 | 1/1910 |
| JP | H02221006 | 9/1990 |
| WO | 2004/058603 A1 | 7/2004 |

*Primary Examiner* — Gene O Crawford
*Assistant Examiner* — Keith R Campbell
(74) *Attorney, Agent, or Firm* — Hodgson Russ LLP

(57) ABSTRACT

A hybrid module has a bridge section with a first transverse end and a second transverse end. Each end module has a body with an inner end and an outer end. The inner ends of each module are configured to be attached to a corresponding end of the bridge section. The inner ends may be removably attached to the corresponding ends of the bridge section using a coupler on the inner end and, in some cases, a mating coupler on the corresponding end of the bridge section.

30 Claims, 16 Drawing Sheets

(56) References Cited

U.S. PATENT DOCUMENTS

| | | | |
|---|---|---|---|
| 6,814,216 B2* | 11/2004 | Veit | B07C 5/362 |
| | | | 198/370.02 |
| 6,827,204 B2* | 12/2004 | Cribiu' | B65G 17/08 |
| | | | 198/822 |
| 6,868,959 B2 | 3/2005 | Thomas | |
| 6,997,308 B2* | 2/2006 | Guernsey | B65G 17/08 |
| | | | 198/850 |
| 7,284,657 B2* | 10/2007 | Ulsh | B65G 17/086 |
| | | | 198/852 |
| 7,314,132 B2* | 1/2008 | Layne | B65G 17/08 |
| | | | 198/850 |
| 7,703,601 B2 | 4/2010 | DeLair | |
| 7,878,323 B2* | 2/2011 | Van Rees | B65G 17/08 |
| | | | 198/841 |
| 8,522,961 B2 | 9/2013 | Marshall | |
| 8,944,241 B2 | 2/2015 | Ozaki | |
| 9,327,905 B2 | 5/2016 | Stefanko | |
| 2004/0173441 A1* | 9/2004 | Wieting | B65G 17/067 |
| | | | 198/850 |
| 2004/0222073 A1 | 11/2004 | Oreste | |
| 2006/0157325 A1* | 7/2006 | Loutzenheiser | B24C 3/18 |
| | | | 198/851 |
| 2007/0175738 A1 | 8/2007 | Neely et al. | |
| 2009/0107805 A1* | 4/2009 | Layne | B65G 17/063 |
| | | | 198/617 |
| 2011/0278138 A1 | 11/2011 | Weisner et al. | |
| 2016/0001978 A1 | 1/2016 | Ragan | |
| 2016/0297160 A1 | 10/2016 | Bohnert | |

* cited by examiner

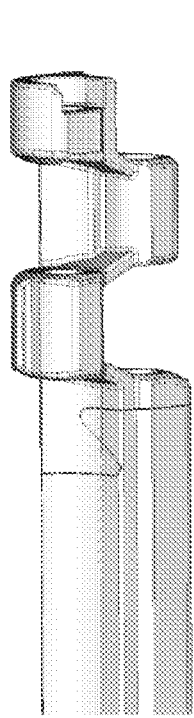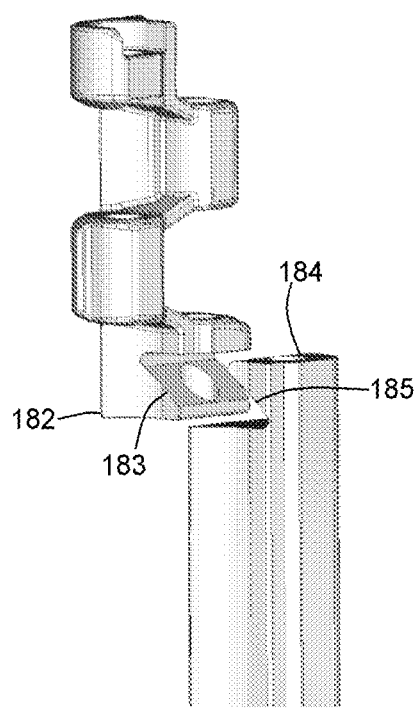
Fig. 12A    Fig. 12B
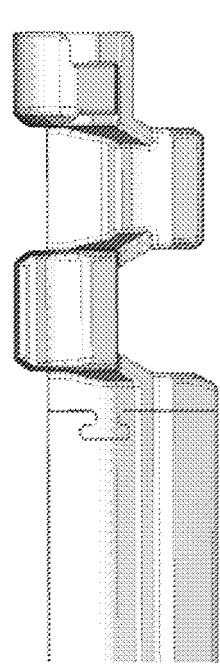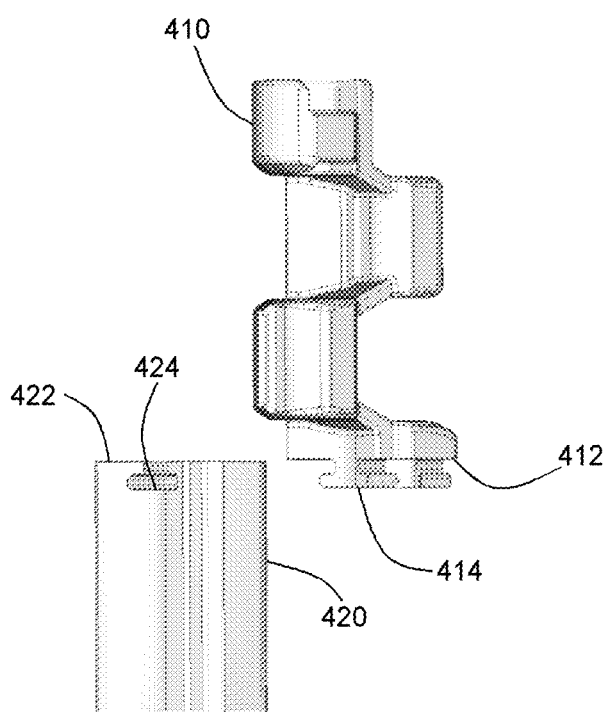
Fig. 13A    Fig. 13B

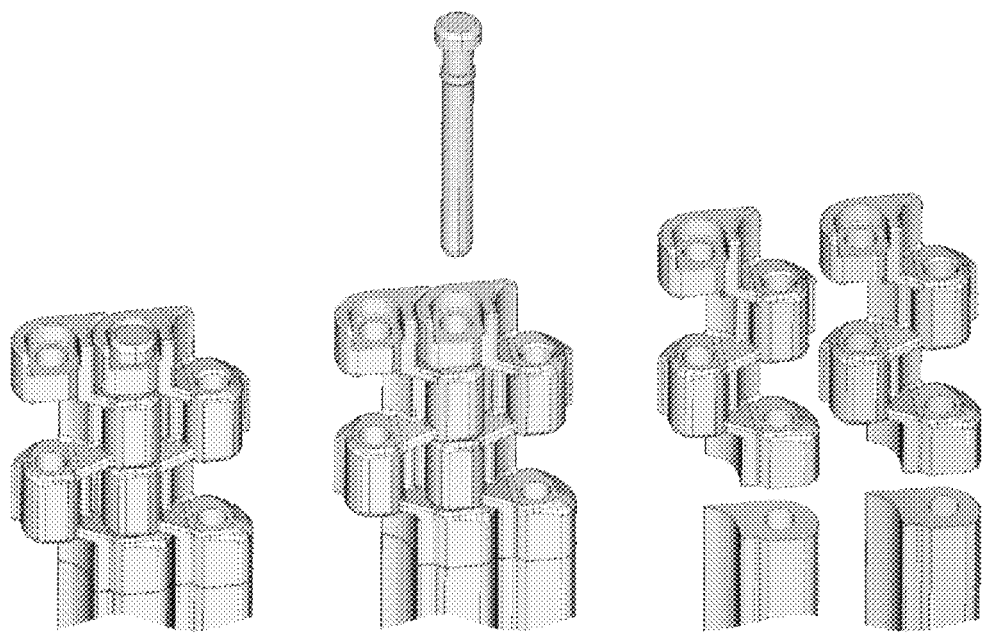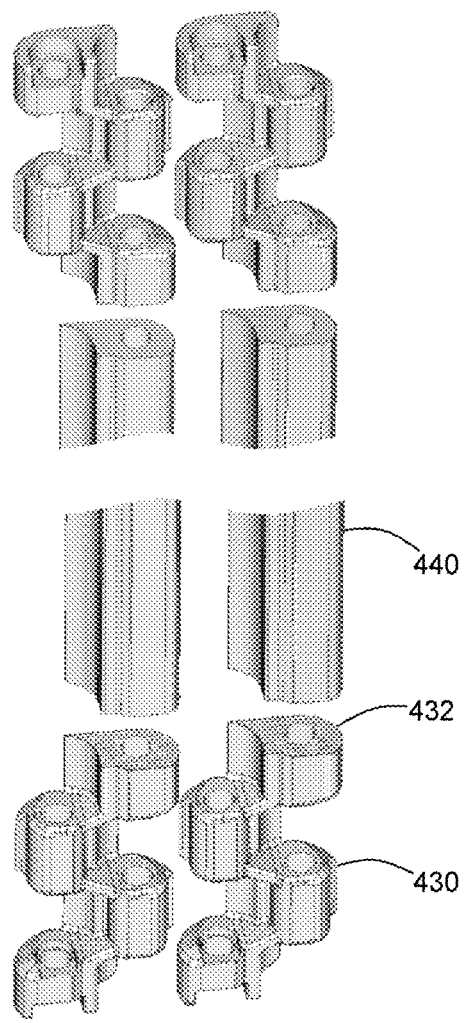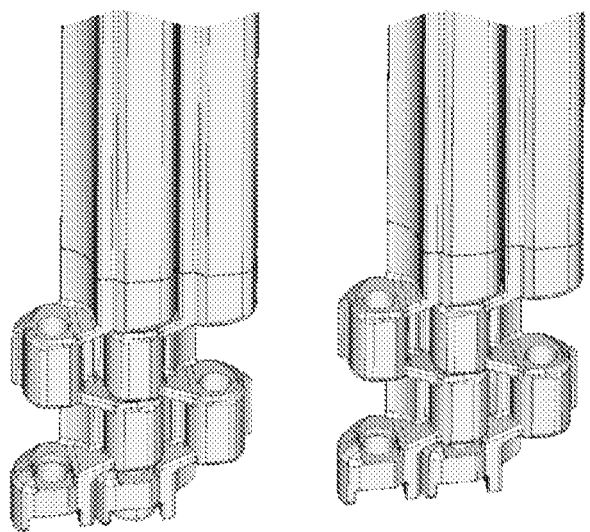
Fig. 15A  Fig. 15B  Fig. 15C

HYBRID MODULAR BELT

FIELD OF THE DISCLOSURE

The disclosure relates to modular conveyor belts.

BACKGROUND OF THE DISCLOSURE

Modular belts are constructed by interconnecting belt modules with link ends to the corresponding link ends of adjacent belt modules using pivot rods. Typically, wider belts are formed by using belt modules are longer in the transverse direction (relative to the direction of belt travel) and/or by using two or more belt modules disposed adjacent to each other in the transverse direction—forming rows having two or more belt modules. Often such belt modules are disposed in a brick-laid fashion such that the ends of each module of a row do not line up with ends of each module in an adjacent row of modules.

Each belt module having a plurality of link ends interconnected with a corresponding plurality of link ends of an longitudinally adjacent module causes difficulty in cleaning a belt formed of such modules. Additionally, rows formed from two or more modules can create additional gaps between the modules despite efforts to minimize distances between modules. Such gaps and interdigitated link ends create many recesses, corners, and other discontinuities where foreign matter may become lodged and difficult to clean. This can be especially problematic in the food industry where material handing conveyor belts must be cleaned to avoid issues of contamination.

There is a long-felt need for belts with improved cleanability for food handling. Additionally, improvements in strength and durability would be beneficial in food handling as well as other industries.

BRIEF SUMMARY OF THE DISCLOSURE

A hybrid module for a modular belt is disclosed herein. The hybrid module has a bridge section with a first transverse end and a second transverse end. Each end module has a body with an inner end and an outer end. The inner ends of each module are configured to be attached to a corresponding end of the bridge section. The end modules have one or more link ends extending from the body in a first direction of belt travel and one or more link ends extending from the body in a second direction of belt travel which is opposite the first direction. The end modules have an outer link end generally at the outer end of the body. In this way, the outer ends of a plurality of belt modules forming a belt will make up the outside edges of the belt.

Such a belt module can be manufactured using the same or different manufacturing technologies for the end modules and the bridge section. For example, the bridge section may be extruded, while the end modules are injection molded. The use of different manufacturing processes can lower the cost and/or time required to manufacture a belt module made using the same process.

In some embodiments, a link ends at the inner end of the body of each end module has a coupler configured to be removably attached to a corresponding end of the bridge section. The corresponding end of the bridge section may have, for example, a mating coupler configured to cooperate with the coupler of the end module. In this way, a belt module may be assembled an disassembled as may be needed, for example, to repair the belt module.

Some embodiments of the present belt module may include inserts, such as, for example, metal and/or metallic inserts, disposed in the bridge section. In an example, one or more magnetic inserts may be disposed in the bridge section of a belt module. Such an embodiment can be useful in conveying ferromagnetic objects with less movement of the object (relative to the belt module). For instance, a steel object, such as a steel can, can be better conveyed up or down an inclined conveying surface by a belt formed with modules having magnetic insert(s). In another example, a belt module may include one or more metal inserts, for example, steel inserts. Such metal inserts may improve the durability, strength, or other characteristics of the belt module. In an example, a steel insert may protrude above and below the corresponding adjacent surfaces of the bridge section of a module. Such a steel insert can be used to electrically ground conveyed objects disposed on a belt formed from such belt modules.

In some embodiments, a belt module of the present disclosure further includes an additional bridge section and a central module configured to be coupled between the bridge section and the additional bridge section. One or more additional bridge sections and a corresponding number of central modules can be included in the belt module to form belts of desired widths (belt width in a direction perpendicular to belt travel) and longitudinal strength. For example, while bridge sections of the present disclosure can be of any length (thus used to form belts of corresponding width), such modules will be limited by the physical limitations of the materials from which they are formed. As such, a wider belt may be constructed using central modules and additional bridge to overcome such physical limitations (for example, to improve the ability of a belt to convey heavy objects).

In another embodiment of the present disclosure a belt module has a bridge section disposed between two end modules. Such a belt module may be formed as a integrated structure. Each end module has one or more link ends extending in a first direction parallel to a direction of belt travel and opposing link ends extending in a second direction opposite to the first direction. In this way, the link ends of the belt module are configured to interdigitate with the opposing link ends of an adjacent belt module. Such modules can be interconnected using pivot rods. In some embodiments, the bridge section of a belt module has a thickness which is less than the thickness of the end modules. In this way, the belt module may comprise less material, saving manufacturing and/or operating costs.

DESCRIPTION OF THE DRAWINGS

For a fuller understanding of the nature and objects of the disclosure, reference should be made to the following detailed description taken in conjunction with the accompanying drawings, in which:

FIGS. 12A-12B depict an end module and a bridge section according to another embodiment of the present disclosure having T-bar tenons interconnected with corresponding mortises;

FIGS. 13A-13B depict an end module and bridge section according to another embodiment of the present disclosure having T-bar tenons interconnected with corresponding mortises;

FIGS. 15A-15C is a set of views of another embodiment of the present disclosure wherein the inner link ends include ridges for improved engagement with the bridge section.

DETAILED DESCRIPTION OF THE DISCLOSURE

Figure 1:
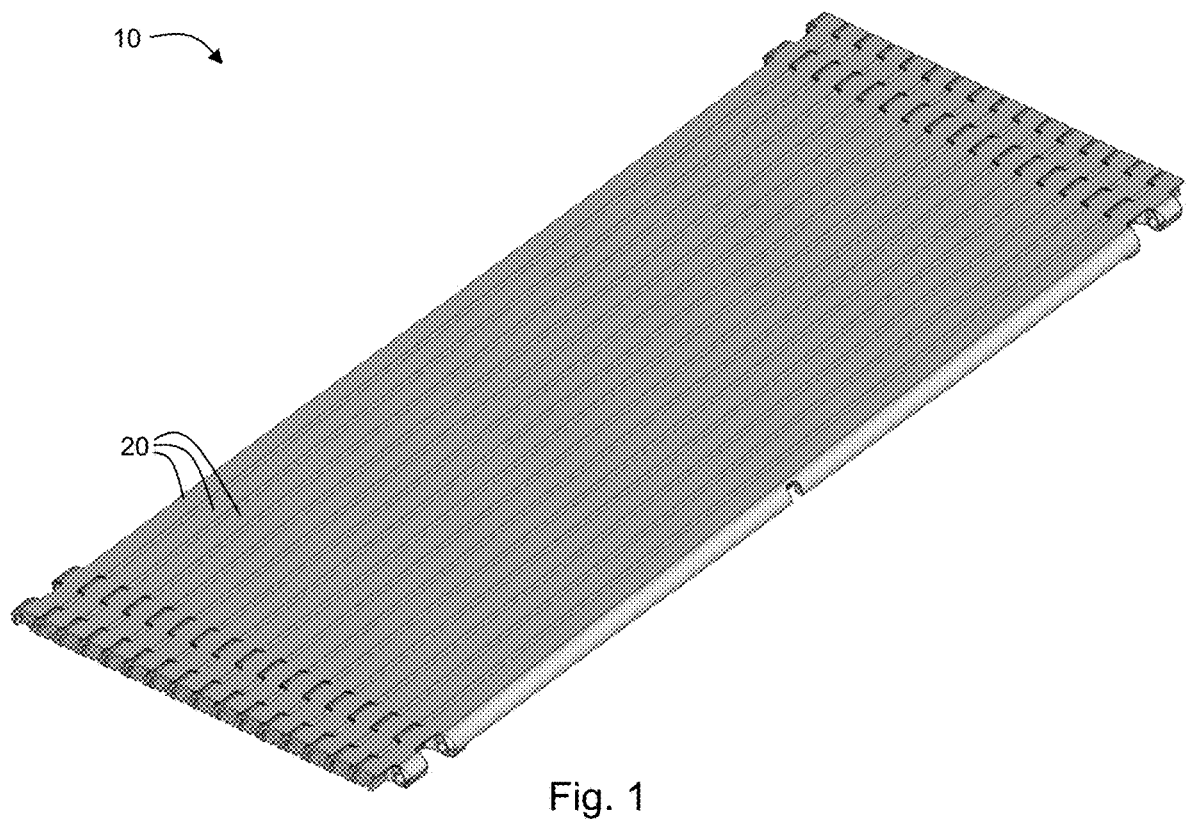
FIG. 1 is a view of a belt according to an embodiment of the present disclosure.

With reference to FIG. 1, the present disclosure may be embodied as a modular belt 10 formed using a plurality of belt modules 20. The belt modules 20 are sometimes referred to herein as "hybrid" belt modules 20 because each module 20 comprises various sections along its length (belt module length is along a direction transverse to a direction of belt travel).

Figure 3A:
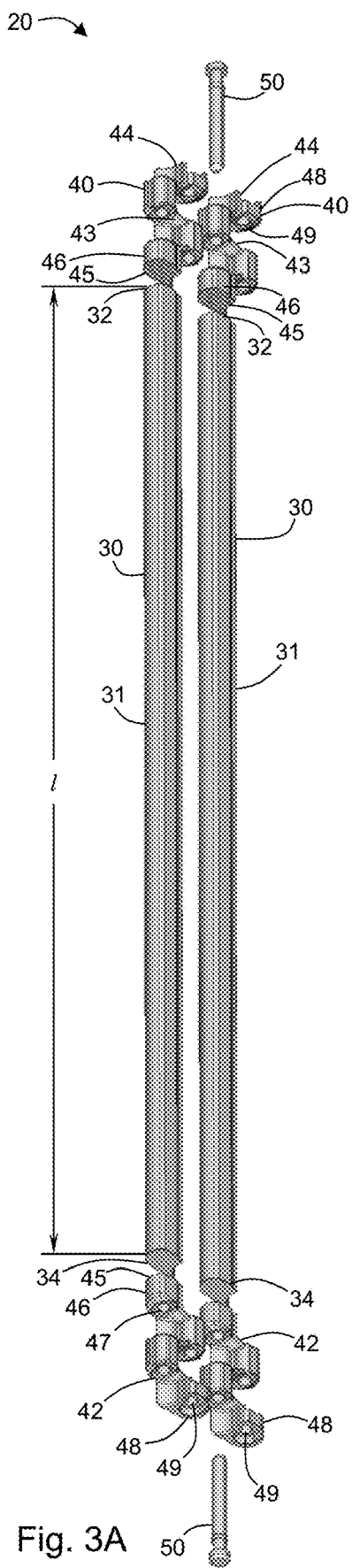
FIG. 3A is an exploded view of two belt modules according to an embodiment of the present disclosure.
Figure 3B:
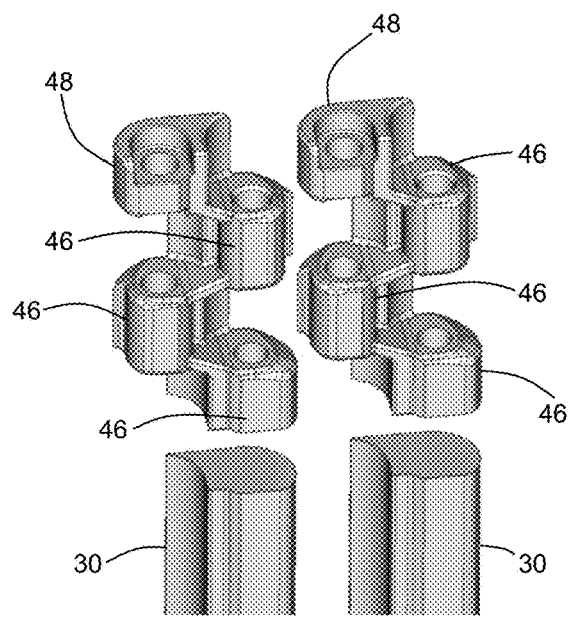
FIG. 3B is an exploded detail view of the belt modules of FIG. 3A
Figure 3C:
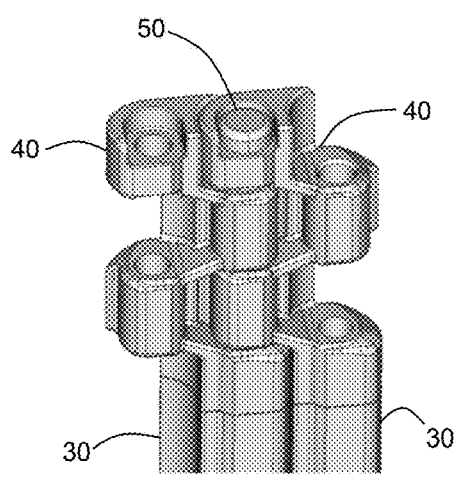
FIG. 3C is a view of the assembled belt modules of FIGS. 3A-3B and connected by a pivot rod.
Figure 4A:
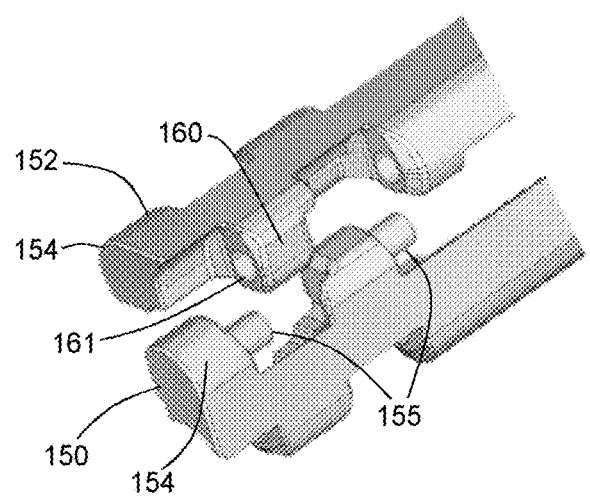
FIGS. 4A-4D are detail views depicting the connection of two belt modules wherein link ends having a pin are inserted into transverse openings of link ends of an adjacent belt module.
Figure 4B:
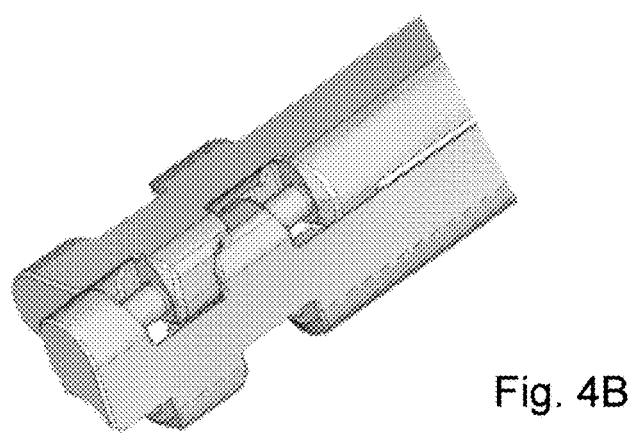
Figure 4C:
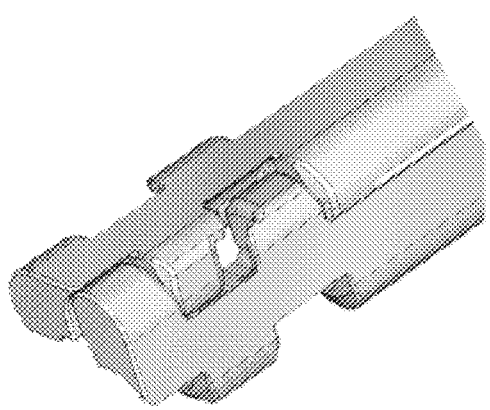
Figure 4D:
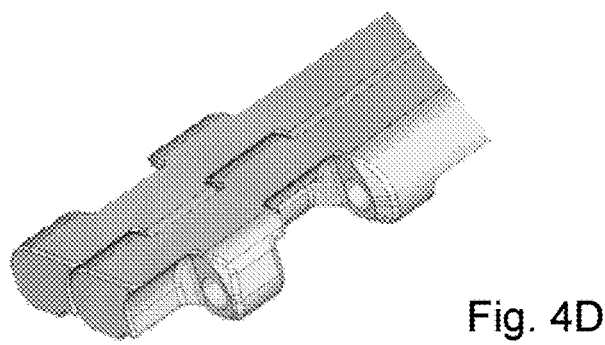
Figure 5A:
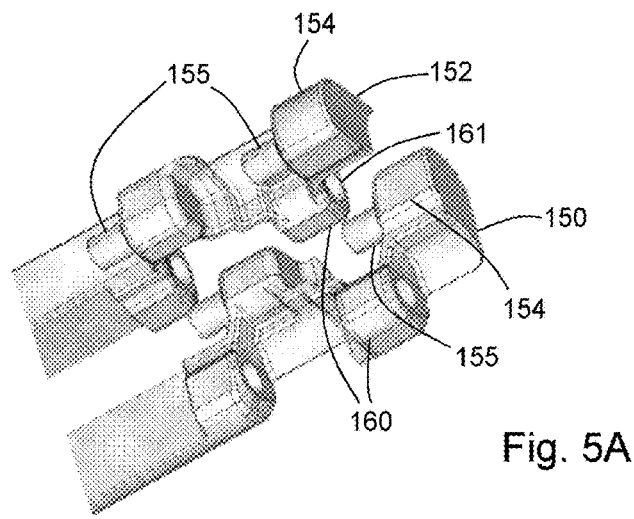
FIGS. 5A-5D depict another view of FIGS. 4A-4D.
Figure 5B:
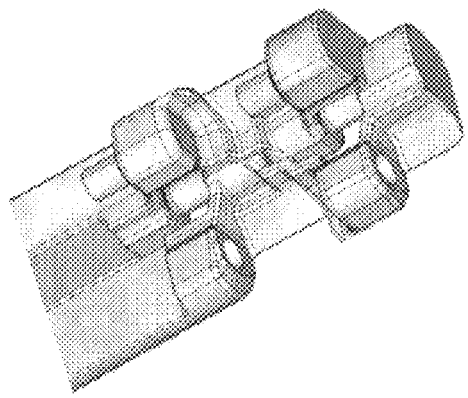
Figure 5C:
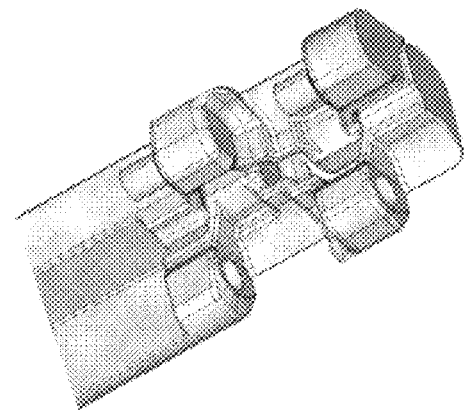
Figure 5D:
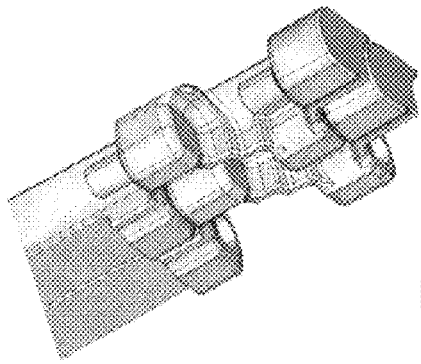
Figure 6A:
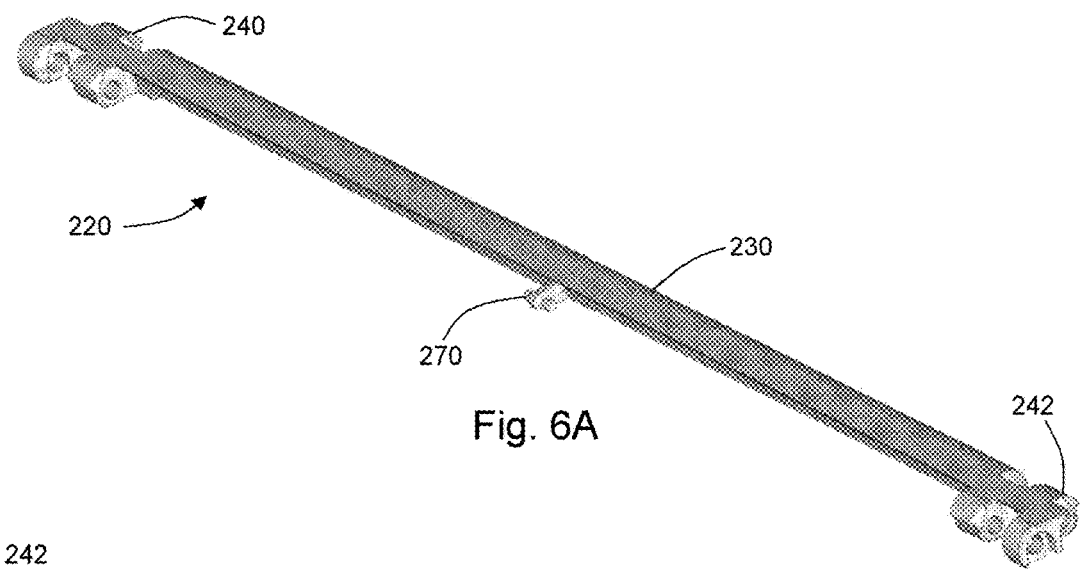
FIG. 6A is a perspective view of a belt module according to another embodiment of the present disclosure.
Figure 6B:
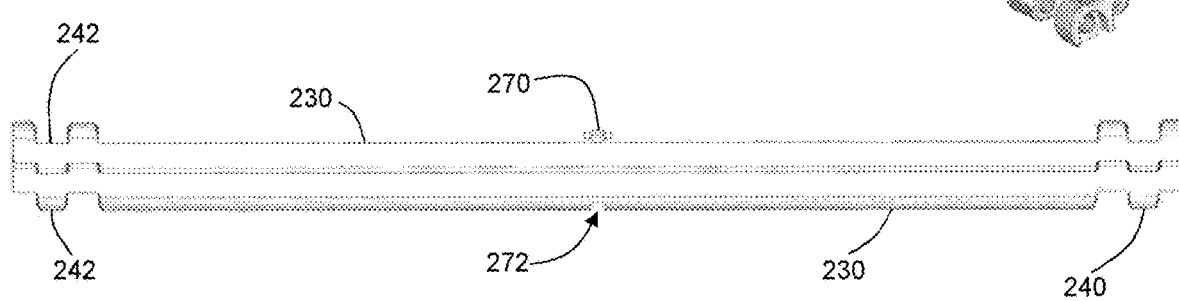
FIG. 6B is a top view of two of the belt modules of FIG. 6A.
Figure 6C:
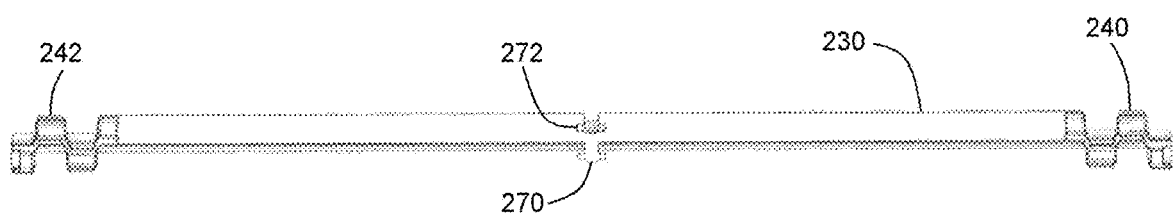
FIG. 6C is a bottom view of a belt module of FIG. 6A.
Figure 6D:
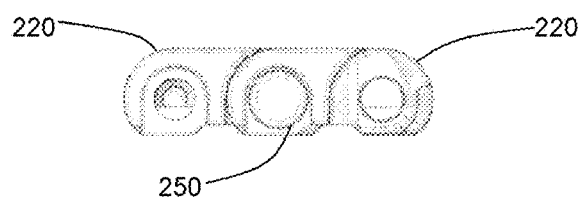
FIG. 6D is an end view of two belt modules of FIG. 6A connected by a pivot rod.
Figure 7A:
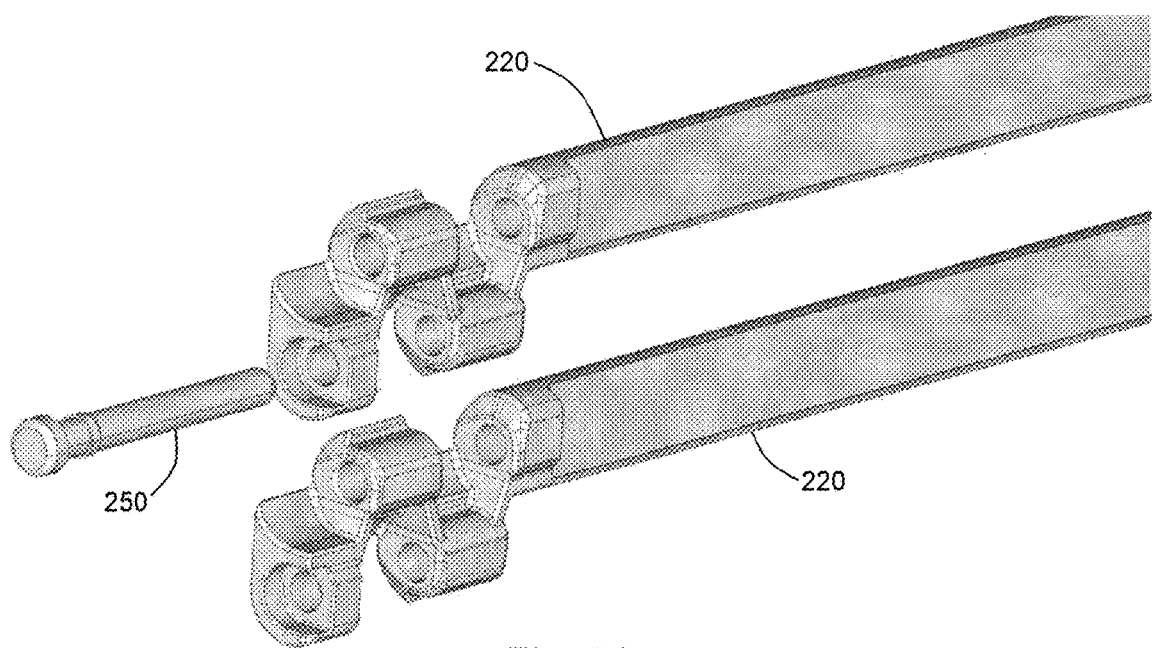
FIG. 7A is an exploded detail view of the two belt modules and pivot rod of FIG. 6D.
Figure 7B:
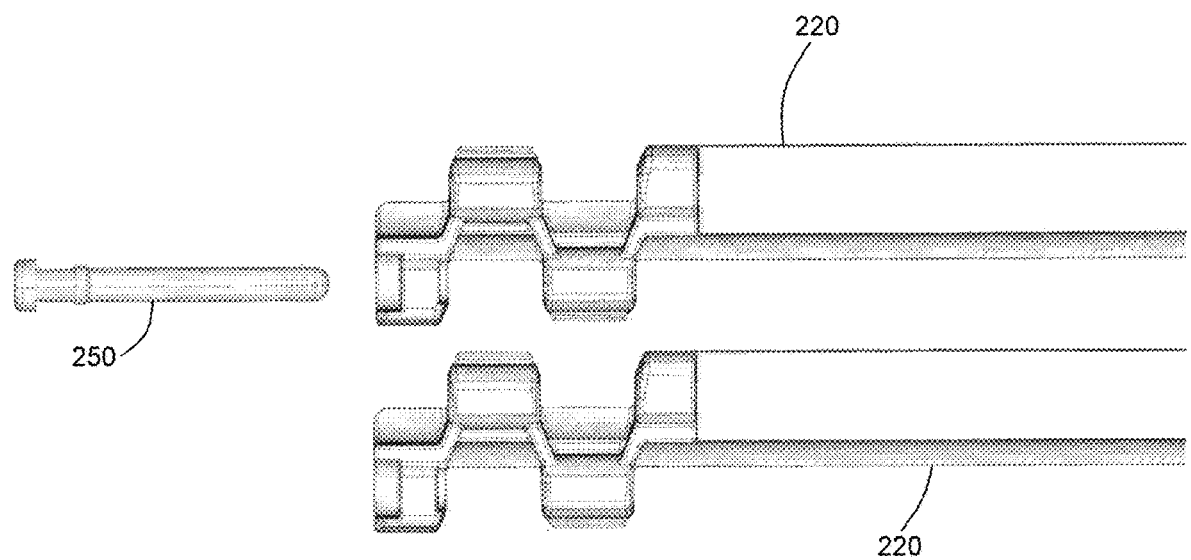
FIG. 7B is a bottom view of FIG. 7A.

In an exemplary embodiment, a hybrid belt module 20 comprises a bridge section 30 (see, for example, FIGS. 3A-3C). The bridge section 30 having a body 31 of length l and a first transverse end 32 and a second transverse end 34 at opposite ends of the body 31. In some embodiments, the body 31 has a cross-sectional area (viewed on a plane perpendicular to the length, for example, FIG. 1B) which is substantially the same along the length l of the body 31. In some embodiments, the body 31 is configured to have a leading surface 36 configured to be convex, a trailing surface 38 configured to be concave, and an intermediate section 39 having a uniform thickness t between the leading end 36 and the trailing end 38. The terms "leading" and "trailing" are used herein with respect to a direction of belt travel such that the leading end 36 is the first portion of the body 31 that passes any particular point location when the belt 10 is moving in a first direction. The configurations of embodiments of the bridge section 30 are further described below under the heading "Uniform Thickness Bridge Section."

The hybrid belt module 20 comprises two end modules 40,42. Each end module 40,42 comprises a body 43 having an outer end 44 and an inner end 45. An outer link end 48 extends from the body 43 in a first direction parallel to the direction of belt travel. One or more inner link ends 46 extend from the body 43. At least one of the inner link ends 46 extend from the body in a second direction which is opposite the first direction and configured to interdigitate with the outer link end of an adjacent belt module. Each if the one or more inner link ends 46 have a transverse opening 47 defined therein. Each end module 40,42 is configured such that one of the one or more inner link ends 46 can be attached to a corresponding one of the transverse ends 32,34 of the bridge section 30. As such, the two end modules 40,42 are configured as enantiomorphs (i.e., mirror images) of one another. In some embodiments, each end module 40,42 is configured to be removably attached to the corresponding one of the transverse ends 32,34 of the bridge section 30. In some embodiments, each end module 40,42 and the bridge section 30 form a unitary structure. For example, the end modules 40,42 and the bridge section 30 may be manufactured as a single structure. In another example, each end module 40,42 is permanently attached to the corresponding one of the transverse ends 32,34 of the bridge section 30, for example, by welding.

By incorporating two end modules 40,42 attached to a bridge section 30, a hybrid belt of the present invention benefits from edge components provided to transmit longitudinal forces while also allowing a central portion which allows different functions such as substantially uniform thickness for x-ray applications, or substantially uniform transparency (when the bridge sections are made from a transparent material) for visual inspection applications. Accordingly, the edge modules 40,42 may be made from a material that is different from the material of the bridge section 30. For example, the bridge sections of a belt may be made from a transparent material, while the end modules may be made from metal, such as, for example, steel. Other materials will be known for any of the components.

In some embodiments, the bridge section 30 has a thickness which is different from a thickness of the end modules 40,42. For example, FIG. 8C depicts an embodiment of a belt module wherein the bridge section 330 has a thickness that is less than a thickness of the end module 340. In this way, manufacturing costs may be reduced due to less material needed to manufacture the belt module. Such a reduction in material can also advantageously reduced operational costs of a belt comprising a plurality of such modules because the belt will have less mass than a traditional belt (where central modules have thicknesses that are similar to end modules).

In another embodiment of the present disclosure a belt module has a bridge section disposed between two end modules. Such a belt module may be formed as a integrated structure. Each end module has one or more link ends extending in a first direction parallel to a direction of belt travel. Each end module additionally includes opposing link ends extending in a second direction parallel to the direction of belt travel and opposite to the first direction. In this way, the link ends of the belt module are configured to interdigitate with the opposing link ends of an adjacent belt module. Such modules can be interconnected using pivot rods. In some embodiments, each end module may be interconnected to adjacent end modules (of adjacent belt modules) using a pivot rod such that a belt module is interconnected to adjacent belt modules using two pivot rods. In other embodiments, the belt modules may be interconnected using a pivot rod having a length sufficient to interconnect the link ends of both end modules. In a preferred embodiment, the bridge section of a belt module has a thickness which is less than the thickness of the end modules. In this way, the belt module may comprise less material, saving manufacturing and/or operating costs.

Figure 17A:
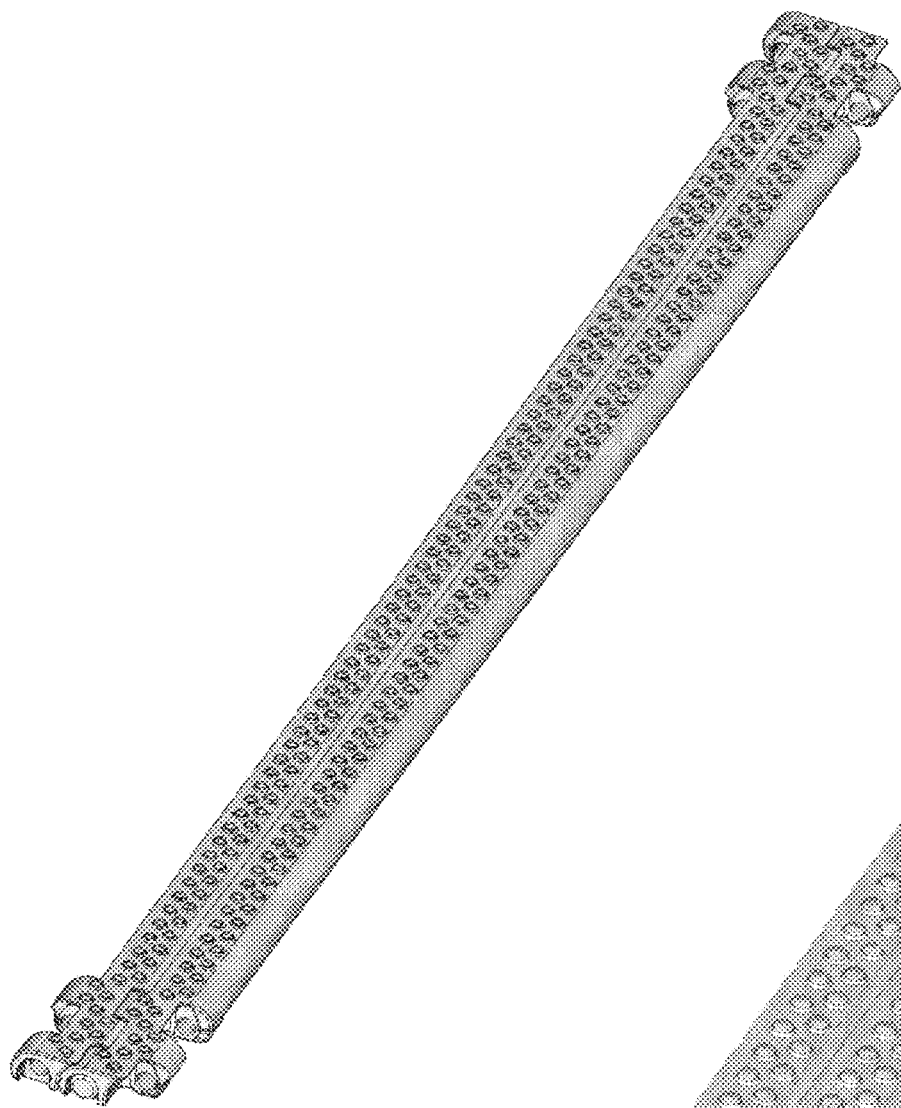
FIG. 17A is a perspective view of an embodiment of the present disclosure having a nub-top surface.
Figure 17B:
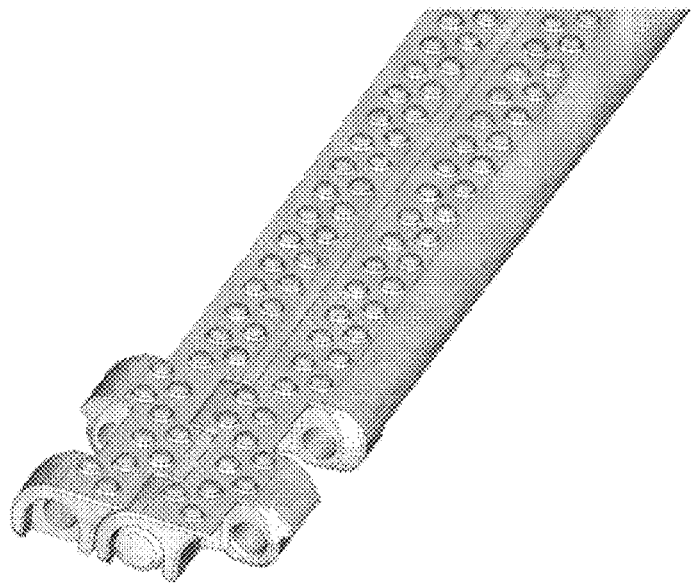
FIG. 17B is a detail view of a portion of the module of FIG. 17A.

Because embodiments of a belt module include a bridge section having no hinge components, for example, link ends and pivot rods, the central portion of a belt module may be more easily cleaned than traditional belt modules. As such, embodiments of the present disclosure may be advantageously used in the food industry where hygiene is important. Furthermore, the bridge portion can be configured to take advantage of the ease with which the present belt modules can be cleaned. For example, the belt module shown in FIG. 17 can be used in a fryer application to provide improved cooking characteristics while also being easy to clean.

Additionally, the components of modules of the present disclosure may advantageously be manufactured by different production methods. For example, in an exemplary belt, the relatively small end modules can be manufactured by injection molding in order to form the shapes required for the end modules. The relatively long bridge sections of the exemplary belt can be made by an extrusion process due to the uniform cross-section that is possible with embodiments of bridge sections of the present invention. The components (end modules and bridge sections) may then be joined using techniques described herein. In some cases, machining or other operations can be performed on the end modules and/or the bridge sections in order to form appropriate couplers.

In some embodiments, the outer link end 48 has a transverse opening 49 defined therein. In this manner, pivot rods 50 may be disposed through the respective transverse openings 47,49 to connect adjacent belt modules such that a belt may be formed using a plurality of modules. In other embodiments, the outer link ends each includes a pin configured to be inserted in the transverse opening of an interdigitated link end of an adjacent module. In the exemplary embodiment depicted in FIGS. 4A-4D, and 5A-5D, modules 150,152 are configured such that the pins 155 of the outer link end 156 (and corresponding additional link ends) may be inserted into corresponding transverse openings 161 of adjacent link ends 160 when a first module 150 is disposed at an angle, for example, 90 degrees, with respect to a second module 152 (see, for example, FIGS. 4A-4B and 5A-5B). The modules 150,152 may then be rotated such that the pins 155 cannot be removed from the transverse openings 161 due to the interdigitating link ends (see, for example, 4D and 5D).

It should be noted that throughout the present disclosure, embodiments are depicted having one additional link end in each of the first and second directions of belt travel; however, the disclosure need not be limited to such exemplary embodiments. It will be apparent to one having skill in the art in light of the disclosure, that other embodiments may have no additional link ends, and still other embodiments may have more than one additional link ends.

In some embodiments, such as the embodiment shown in FIGS. 6A-6D, the bridge section 230 may include one or more supporting link ends 270 and one or more sockets 272 configured to receive the supporting link end 270 of an adjacent module. Such supporting link ends may be advantageous for damping vibration in a belt, particularly when the bridge sections 270 are long and prone to vibration. Accordingly, the supporting link end 270 may be made from any suitable material, including, for example, damping materials such as rubber or other elastomers. Some embodiments having supporting link(s) advantageously provide increased longitudinal stiffness.

As stated above, the inner link end of each of the end modules is attached to the bridge section. In some embodiments of the belt module 220, such as the embodiment depicted in FIGS. 6A-6D and 7A-7B, the bridge section 230 and the end modules 240, 242 are integral. For example, the end modules 240, 242 may be integrally formed with the bridge section 230. In other examples of integral structures, the end modules 240, 242 may be fixedly attached, for example, by welding or other joining technique.

In other embodiments, the end modules are attached to the bridge section by way of couplers. In some embodiments, one of the inner link ends 46 of each end module 40 includes a coupler. Accordingly, each of the first transverse end and the second transverse end of the bridge section includes a mating coupler that is configured to cooperate with couplers of the corresponding one of the end modules. In this way, the end modules may be attached to the bridge section by way of the couplers and the mating couplers. In some embodiments of the disclosed belt modules, the couplers and mating couplers may be configured for removable attachment of the belt module components such that, for example, the belt modules can be reconfigured as needed.

Figure 8A:
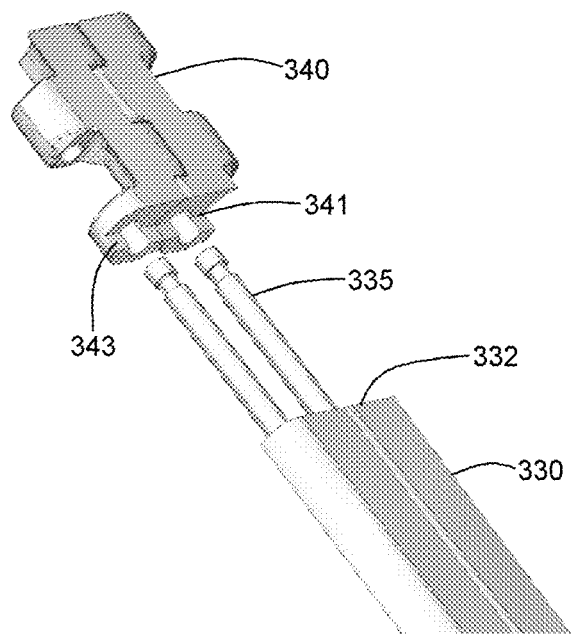
FIGS. 8A-8C are detail views depicting two belt modules of another embodiment of the present disclosure, each Figure showing a different stage of assembly.
Figure 8B:
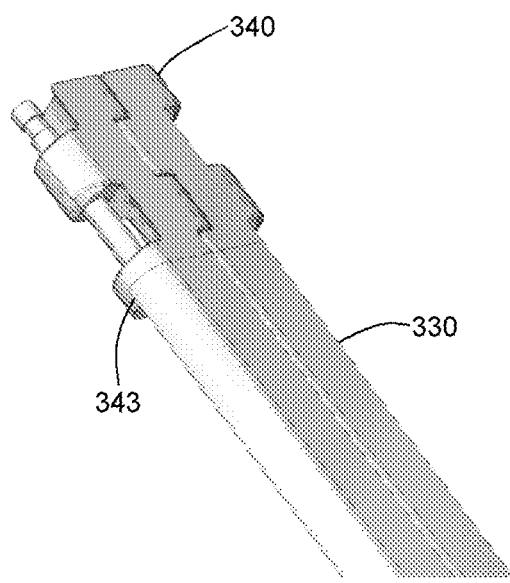
Figure 8C:
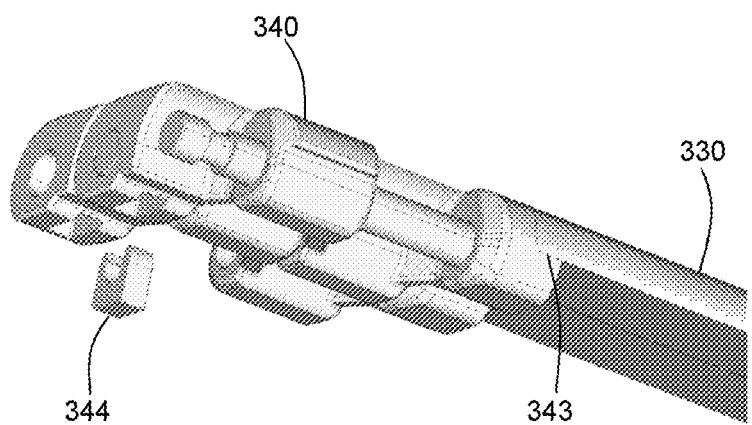
Figure 9A:
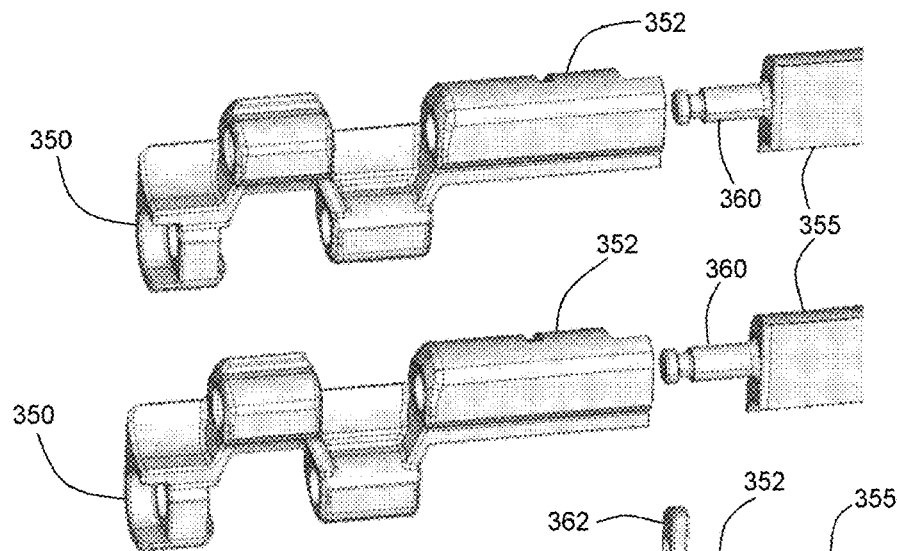
FIGS. 9A-9D are detail views depicting two belt modules of another embodiment of the present disclosure wherein the bridge section includes rod couplers clipped within the inner link ends of corresponding end modules, and wherein the end modules are interconnected to adjacent end modules using pivot rods, each Figure showing a different stage of assembly.
Figure 9B:
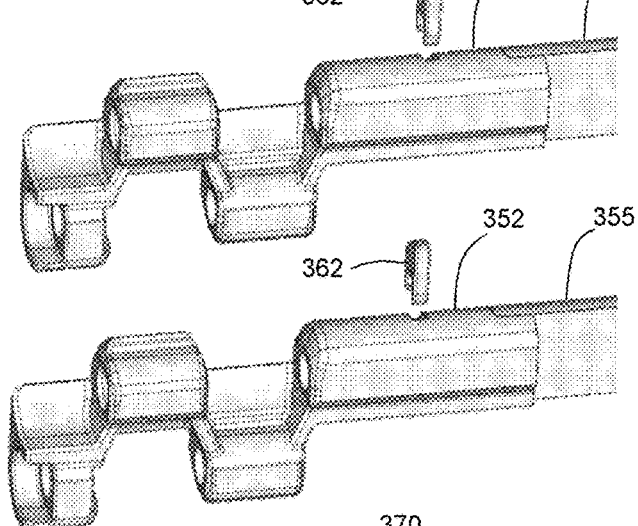
Figure 9C:
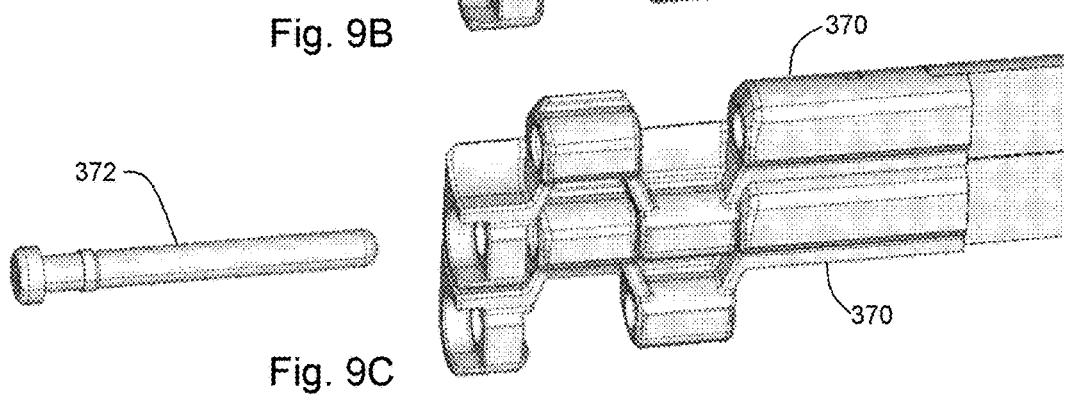
Figure 9D:
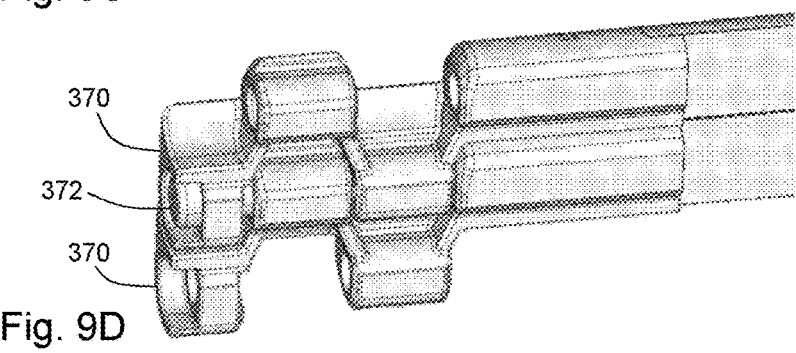

In the embodiment depicted in FIG. 8A-8C, the mating couplers 335 of the bridge section 330 comprise a rod affixed to each transverse end 332 of the bridge section 330. In the depicted embodiment, the rods are configured as pivot rods. A coupler 341 of the inner link end of each end module 340 is configured to have a lap 343 so as to prevent rotation of the bridge section 330 with respect to the corresponding end modules 340 of a belt module. In such an embodiment, clips 344 may be provided to retain the end modules on the rods. Each clip 344 may be disposed through a link end of an end module and received in a groove of a corresponding rod. In some embodiments, the rod shown in FIGS. 8A-8C is a separate component, not affixed to the transverse end, extending from one transverse side of the hybrid module to the other transverse side. Such a rod is configured to connect the bridge section 330 and two end modules 340 together. Each end module 340 is fixed by, for example, a clip that is pushed onto the rod.

FIGS. 9A-9D depict another embodiment using a rod coupler 360 and having clips 362 for securing the end modules 350. In this embodiment, the clips 362 are disposed through the inner link ends 352 to secure the rod 360. As such the end modules 350 and bridge section 355 may be attached to form the belt module 370, and a separate pivot rod 372 may be used to interconnect adjacent belt modules 370.

Figures 10A, 10B:
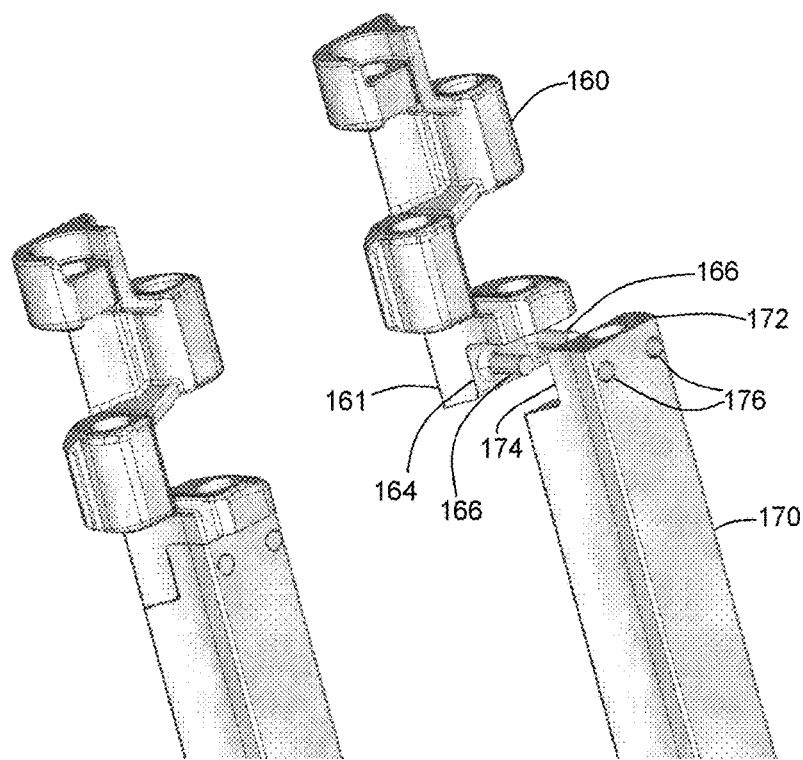
FIGS. 10A-10B depict an end module and a bridge section according to another embodiment of the present disclosure having a lap and pin coupler.

In the embodiment depicted in FIGS. 10A-10B, the coupler 161 of the inner link end of each end module 160 comprises a lap 164 having one or more retention pins 166. Accordingly, the ends of the bridge section 170 comprises a mating coupler 172 having a corresponding lap 174 and holes 176 configured to receive the retention pins 166 of the coupler 161. It should be noted that the laps 164, 174 may be configured in any orientation (horizontally, vertically, or diagonals). Furthermore, the retention pins may be provided on the mating couplers of the bridge section and the corresponding holes on the couplers of the end modules. In the embodiment depicted in FIG. 12A-12B, the couplers 182 and mating couplers 184 are configured to have cooperating wedge-shaped laps 183,185. Other shapes will be apparent in light of the present disclosure and are within the scope of the present disclosure.

Figures 11A, 11B, 11C:
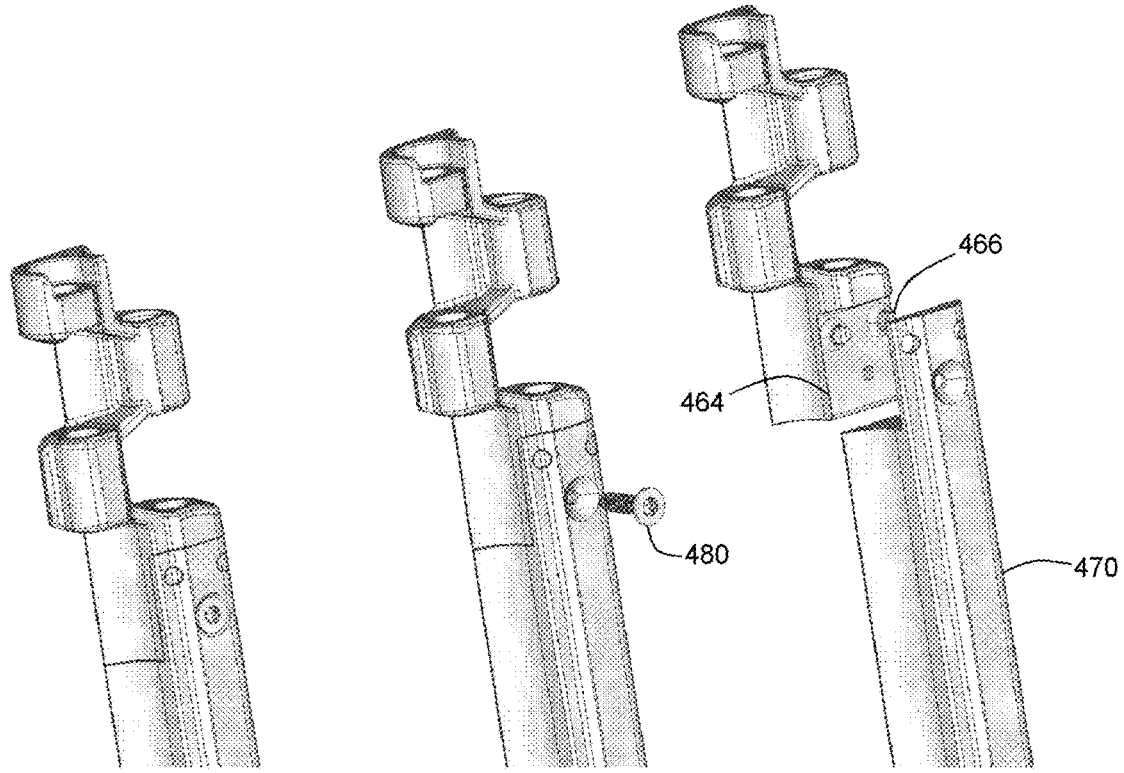
FIGS. 11A-11C depict an end module and a bridge section according to another embodiment of the present disclosure having a lap and pin coupler further secured using a screw.

FIG. 11A-11C depicts an embodiment wherein a lap 464 and pin 466 coupling design is further outfitted with a screw 480 for more secure attachment between the bridge section 470 and the end modules 460. Such use of a screw for attachment is suitable for lap and pin couplers, lap couplers, wedge-shaped couplers, mortise-and-tenon couplers, or any other suitable couplers as will be apparent to one having skill in the art in light of the present disclosure.

Figures 14A, 14B:
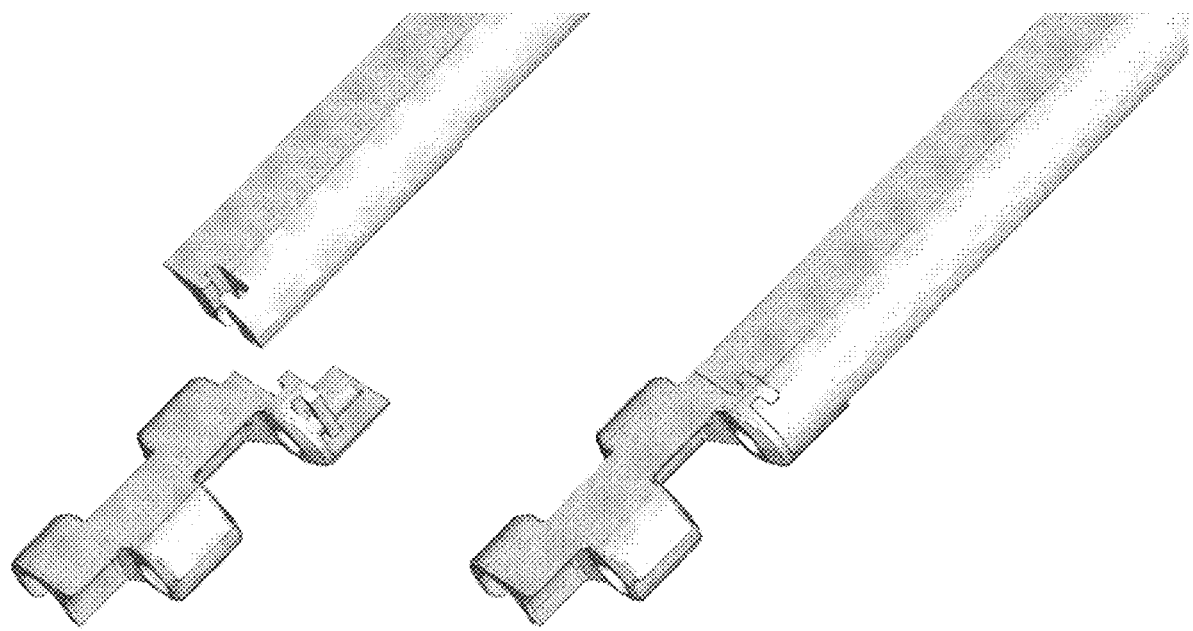
FIGS. 14A-14B depict another embodiment of the present disclosure wherein the bridge section includes rod couplers clipped within the inner link ends of corresponding end modules, and wherein the end modules are interconnected to adjacent end modules using pivot rods.

In some embodiments, the couplers 412 of the end modules 410 are configured with a tenon 414, such as, for example, a dovetail tenon or a 'T'-bar tenon as depicted in FIGS. 13A-13B. Accordingly, the mating couplers 422 of the bridge section 420 are configured with correspondingly-shaped mortises 424 to receive the tenons 412 of the end modules 410. Again, it should be noted that the tenons may be configured as the mating couplers of the bridge section, with the corresponding mortises configured as the couplers of the end modules. Additionally, the mortise-and-tenon couplers may be configured for horizontal insertion (FIGS. 13A-13B), vertical insertion (FIGS. 14A-14B), or diagonal insertion.

Embodiments of the present disclosure can be manufactured using typical methods such as, for example, injection molding, machining, etc. Moreover, the use of a hybrid design, having a bridge section which is attachable to end modules, as disclosed herein, can advantageously be manufactured using differing techniques. In an example, end modules can be manufactured by injection molding, while corresponding bridge sections can be extruded. As such, components of a hybrid module can be made using the technique best suited (e.g., fastest, lowest cost, etc.) to the particular component. Other techniques will be apparent to those skilled in the art in light of the present disclosure.

Figure 19:
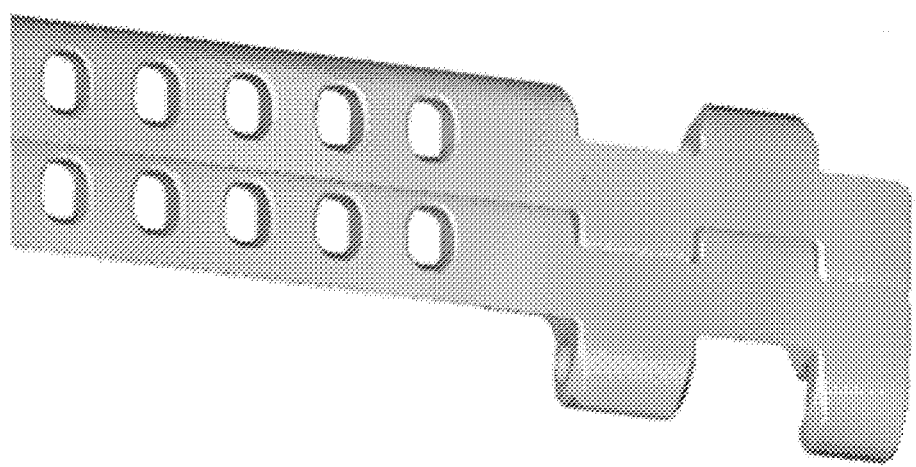
FIG. 19 depicts a portion of a belt module having a bridge section configured as a flush grid.

One or more components of a hybrid module can have a surface structure. For example, the embodiment depicted in FIG. 19 includes a bridge section having a flush grid—a grid structure which is flush at the top and bottom surfaces of the bridge section. Embodiments of the hybrid module may have end modules and bridge sections with the same or different surface structures. For example, in the embodiment of FIG. 19, the surface structure of the bridge section differs from that of the end modules. In another embodiment, depicted in FIGS. 17A-17B, the surface structure of the bridge sections is the same as that of the end modules—in this embodiment, the components have a nub-top surface. Other surface structures will be apparent to those having skill in the art in light of the present disclosure.

Figure 18A:
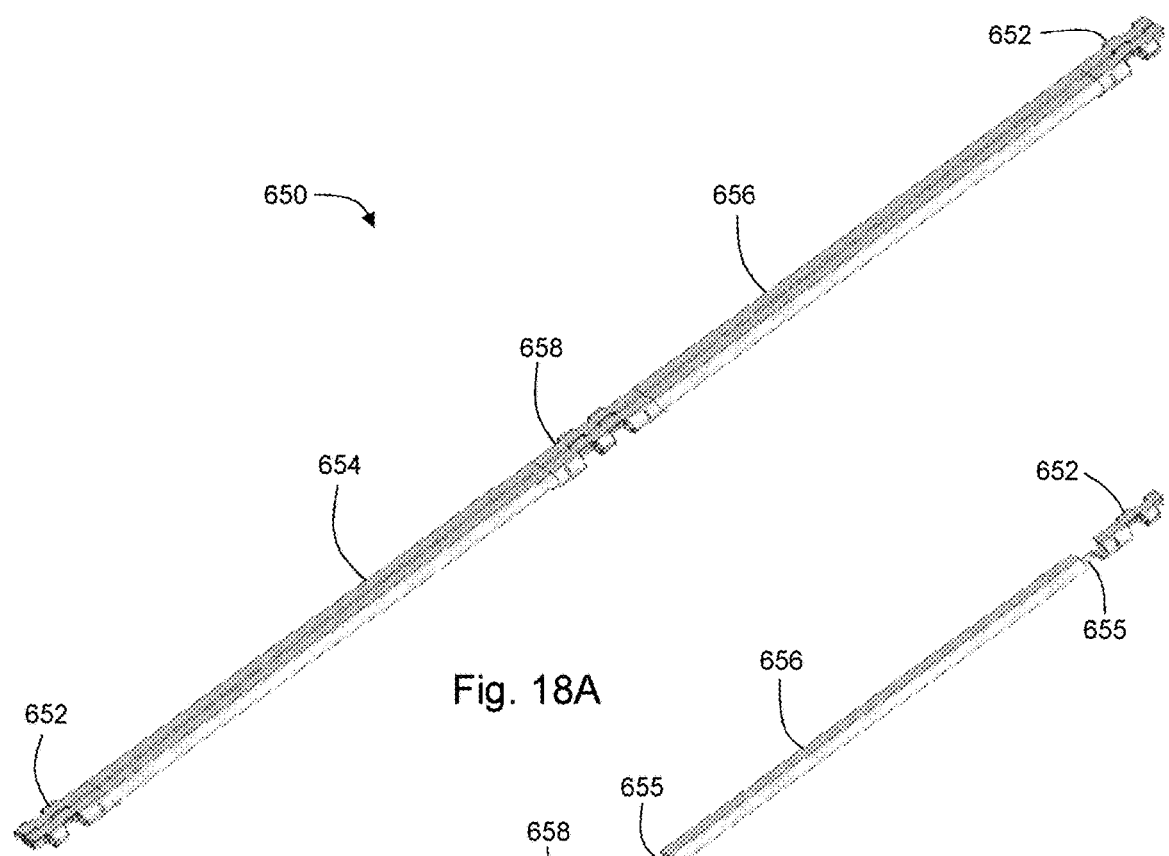
FIG. 18A is a perspective view of belt modules according to another embodiment of the present invention.
Figure 18B:
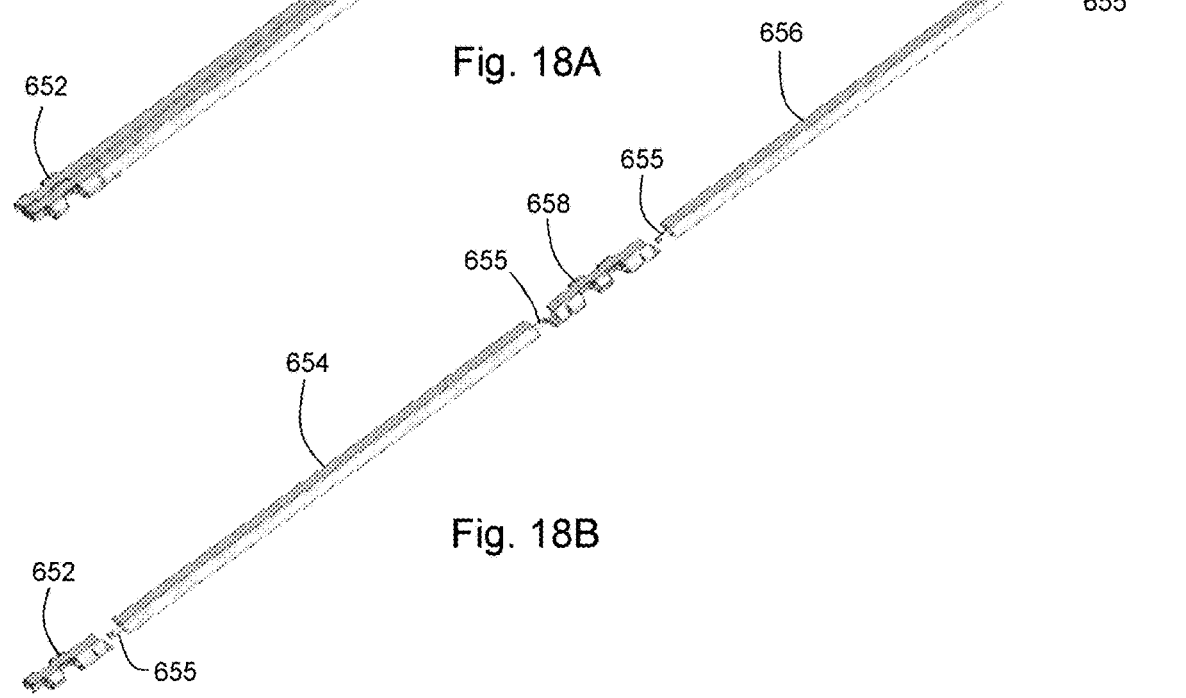
FIG. 18B is an exploded perspective view of a belt module of the embodiment of FIG. 18A.
Figure 18C:
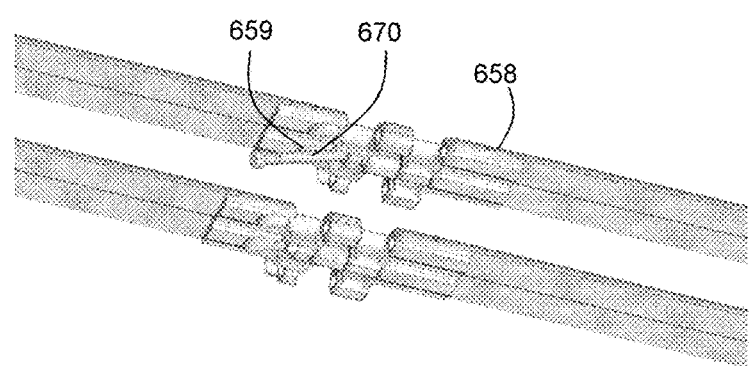
FIG. 18C is a bottom view of a detail of the belt modules of FIG. 18A.

Other embodiments of a belt module 650, such as that depicted in FIGS. 18A-18C, include end modules 652 and bridge section 654, as in the embodiment described above. In the depicted embodiment, the belt module 650 further comprises an additional bridge section 656 and a central module 658. Through the use of one or more central modules 658 and a corresponding number of additional bridge sections 656, belt module 650 may be designed in custom widths. The additional central module(s) 658 may further provide improved longitudinal characteristics (e.g., longitudinal stiffness, etc.) via linkage with central modules 658 of adjacent belt modules 650 by way of pivot rods 670. Pivot rods 670 can be inserted to link central modules 658 by insertion of the pivot rod 670 using a recess 659 in the central module 658. Central module 658 may be coupled between bridge section 654 and additional bridge section 656 using any of the couplers 655 described herein or other configurations which will be apparent in light of the present disclosure.

Figure 20:
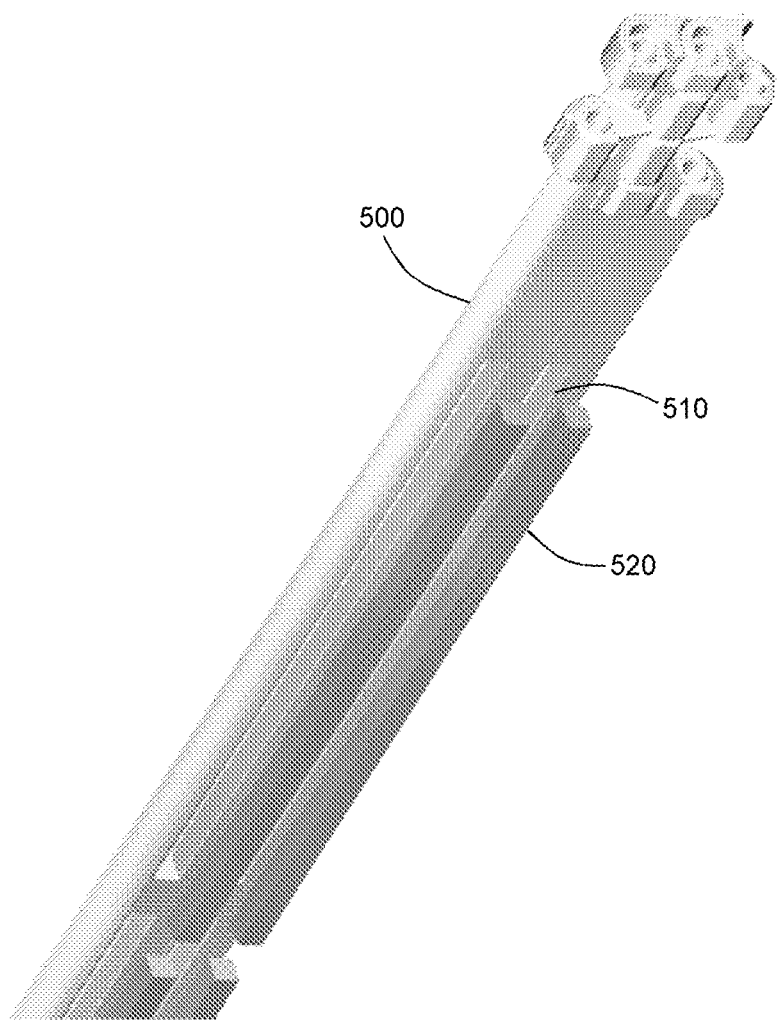
FIG. 20 depicts portions of belt modules with recesses configured to receive magnets.

FIG. 20 depicts another embodiment of a hybrid module 500 of the present disclosure. The bridge section of hybrid module 500 includes a recess 510 which is configured to contain a member 520. The member 520 may be, for example, a magnet. Embodiments of modules with recesses may have more than one recess. For example, in the exemplary embodiment depicted in FIG. 20, each bridge section comprises more than one recess 510 in which a member 520, for example, a magnet, may be disposed. Such embodiments can be used to attract, for example, steel cans or other conveyed materials enabling improved conveyance on inclines. In another example, the member 520 is a metal, for example, a ferrous member (e.g., an iron or steel member). In some embodiments, the member is configured to improve the stiffness of the bridge section along the length of the bridge section—e.g., to improve the flatness of the bridge section. In some embodiments, the member is configured to improve the toughness of the bridge section—e.g., to reinforce the bridge section against damage from cuts.

The recess may be configured such that an insert, for example, a steel insert, protrudes beyond an adjacent belt surface. For example, a belt embodiment having a steel insert which protrudes above a top, conveying surface of a plurality of the belt modules can provide improved durability to the top surface of the belt. In some cases, such improved durability is resistance to cutting. In another example, a belt module has a bridge section with a top surface of a steel insert protruding above the top surface of the bridge section and the steel insert also has a bottom surface which protrudes below a bottom surface of the bridge section. Such a belt module can be used to electrically connect conveyed objects to a circuit. For example, conveyed objects may be electrically connected to ground by way of such steel inserts. A belt may be entirely comprised of such electrically conductive modules or the belt may comprise a plurality of such electrically conductive modules interspersed with non-conductive belt modules (belt modules without a steel insert).

In other embodiments, inserts, such as magnetic and/or metallic inserts, are fully encased by the belt material such that no portion of the insert is exposed.

Figure 21:
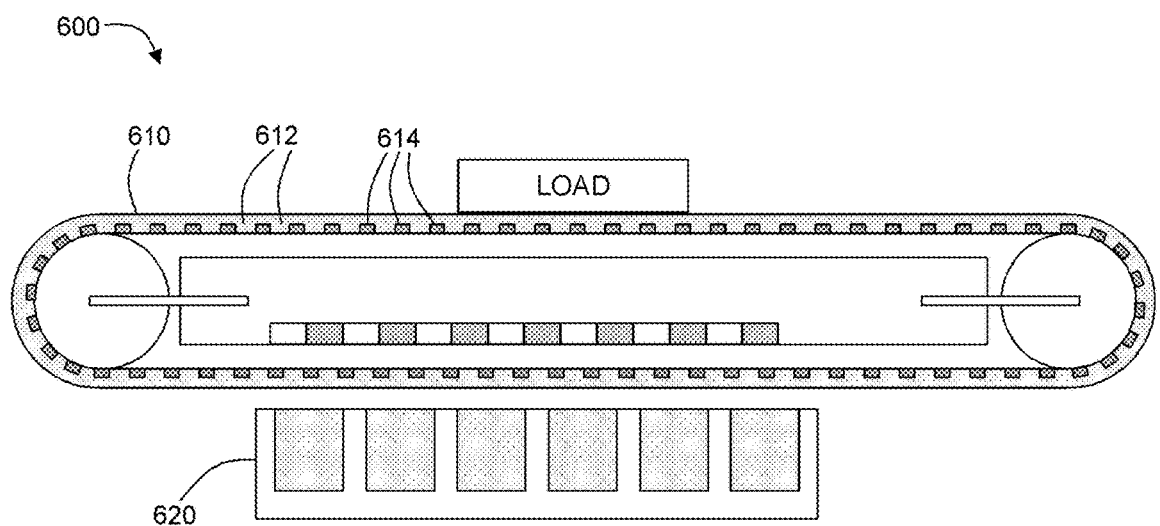
FIG. 21 depicts an embodiment of a conveyor system having a belt formed of a plurality of belt modules having metal segments, and a linear drive motor to cooperate with metal segments.

Embodiment of a belt manufactured using hybrid modules with magnetic and/or ferrous members can be used with linear electric motors for driving the belt. For example, FIG. 21 depicts an embodiment of a conveyor system 600 having a belt 610 comprising a plurality of modules 612, each module having an iron member 614. The conveyor system 600 of the present example includes a 3-phase windings 620 to create a linear induction motor in which the 3-phase windings 620 act on the iron members 614 of the belt modules 612. In this way, the members 614 form the rotor of a linear induction motor. In some embodiments, the motor is a double-sided linear motor with windings 620 located adjacent to each of the belt surfaces. In another embodiment, the use of magnetic members 614 can be used with a linear DC motor. Other linear motor configurations are known and can be used in embodiments of the present disclosure.

Figure 22:
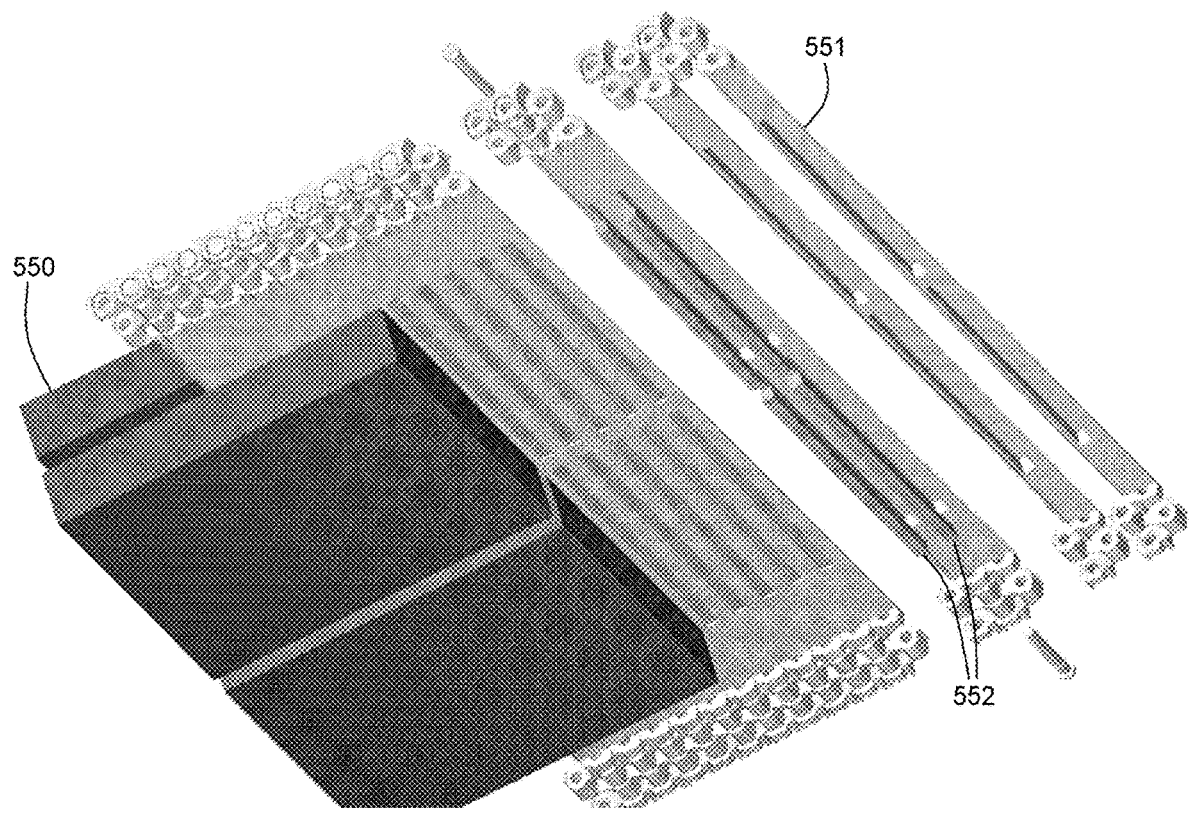
FIG. 22 depicts belt modules having metal segments for driving a belt using a linear drive motor.

It is known that linear motors benefit from minimizing the distance from the "rotor" member and the windings. The hybrid modules 612 of the present disclosure allow improved performance of linear motors by providing the ability for small distances between windings such as windings 620 and members 614. For example, the embodiment depicted in FIG. 22 shows windings of a double-sided motor 550 being disposed in advantageously close proximity to the members 552 of the belt modules 551.

In another aspect, the present disclosure provides a belt made by interconnection of a plurality of belt modules having any of the designs described above. Such a belt may be driven by sprockets interacting with each of the end modules. For example, a conveyor belt system may comprise a modular belt having two end modules attached to a central bridge section, and two drive sprockets, each drive sprocket interfacing with a corresponding plurality of end modules at one side of the belt.

Uniform Thickness Bridge Section

Figure 2A:
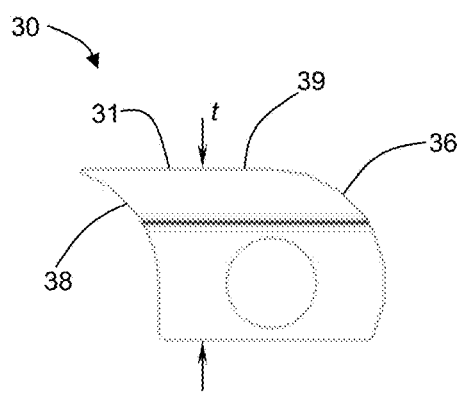
FIG. 2A is an end view of a bridge section according to an embodiment of the present disclosure.
Figure 2B:
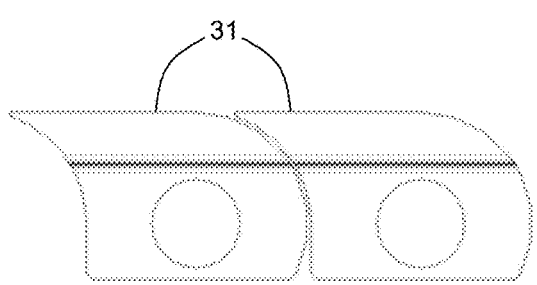
FIG. 2B is an end view showing two adjacent bridge sections of FIG. 2A.

In some embodiments of the present disclosure, the bridge section has a uniform thickness between a leading surface and a trailing surface (see, e.g., FIGS. 2A and 2B). Such a uniform thickness can provide enhanced cleanability due to fewer discontinuities (e.g., corners, recesses, etc.) in the module shape. Additionally, uniform thickness central portions can be used for applications such as x-ray inspection of conveyed materials. Such uniform thickness of the bridge sections of the belt modules allows for uniform artifact in an x-ray (or other modality) system. As such, the uniform artifact, such as, for example, uniform signal attenuation, can be corrected in the imaging system. In such applications, it may be advantageous to reduce or minimize the gap between the trailing edge of a bridge section and the leading edge of the bridge section of an adjacent bridge module. For example, in some embodiments, the gap is maintained between 0.1-1 mm. Larger gaps may adversely affect x-ray inspection.

Figure 16:
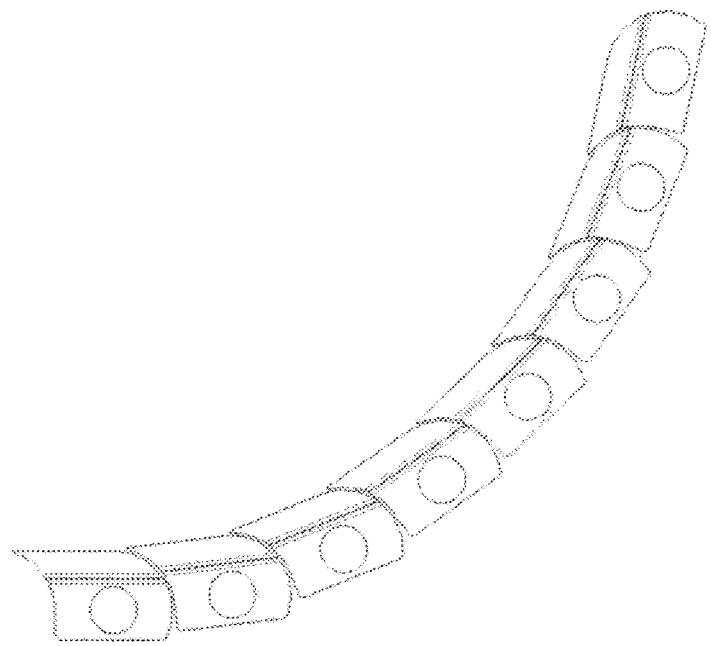
FIG. 16 depicts back-bending of a plurality of bridge sections of an embodiment according to the present disclosure.

An exemplary bridge section 30 of the present disclosure comprises a convex leading surface 36 and a correspondingly concave trailing surface 38. In a preferred embodiment, the transverse openings of the end modules (for receiving pivot rods) are positioned such that the central axis of the transverse openings coincides with the center of the belt thickness. In this way, a modular belt of the present design will not only flex in the common manner—by rotating downwardly around a sprocket or other guide—but the belt may also "back flex" as depicted in FIG. 16. Combined with a tight belt pitch (for example, 0.5" pitch), such belts may be used with standard conveyor designs rather than requiring dedicated designs to accommodate belts with no back flexing.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A hybrid module for a modular belt, comprising:
a bridge section having a first transverse end and a second transverse end;
two end modules, each end module comprising:
a body having an outer end and an inner end;
an outer link end extending from the body in a first direction parallel to a direction of belt travel; and
one or more inner link ends extending from the body, at least one of the inner link ends extending from the body in a second direction opposite the first direction and configured to interdigitate with the outer link end of an adjacent end module, the one or more inner link ends each having a transverse opening defined therein; and
wherein the bridge section has a body with a leading surface configured to be convex and a trailing surface configured to be concave.

2. The hybrid module of claim 1, wherein one of the one or more inner link ends of each of the end modules has a coupler configured to be removably attached to a corresponding end of the bridge section.

3. The hybrid module of claim 1, wherein the outer link end of each end module has a transverse opening defined therein.

4. The hybrid module of claim 1, wherein the outer link end includes a transverse pin configured to be inserted in the transverse opening of an interdigitated inner link end of an adjacent module.

5. The hybrid module of claim 2, wherein each of the first and second transverse ends of the bridge section includes a mating coupler configured to mate with a respective one of the couplers of the two end modules.

6. The hybrid module of claim 5, wherein the coupler of each end module is configured as a lap.

7. The hybrid module of claim 6, wherein each of the laps includes one or more pins.

8. The hybrid module of claim 5, wherein the couplers comprise a tenon and the mating couplers comprise a mortise.

9. The hybrid module of claim 8, wherein the tenons are configured as dovetail tenons.

10. The hybrid module of claim 2, wherein the coupler of each end module is ridged for improved engagement with the bridge section.

11. The hybrid module of claim 2, wherein the mating couplers of the bridge section comprise a coupling rod, and the each end module further comprises a rod retention clip for securing the coupling rod to the end module.

12. The hybrid module of claim 11, wherein the outer link end of each end module has an orifice configured to receive the rod retention clip.

13. The hybrid module of claim 11, wherein one of the one or more inner link ends of each end module has an orifice configured to receive the rod retention clip.

14. The hybrid module of claim 1, wherein the bridge section further comprises:
   a supporting link end extending in a direction of belt travel; and
   a socket configured to receive a supporting link end of a bridge section of an adjacent belt module.

15. The hybrid module of claim 14, wherein the supporting link end is made from a resilient material.

16. The hybrid module of claim 1, wherein the bridge section is made from a different material than the end modules.

17. The hybrid module of claim 1, wherein the end modules are manufactured using a different production method than the bridge section.

18. The hybrid module of claim 1, wherein the bridge section is made by extrusion and the end modules are made by injection molding.

19. The hybrid module of claim 1, wherein the bridge section has a surface structure that is different from a surface structure of the end modules.

20. The hybrid module of claim 19, wherein the bridge section has a nub-top surface structure.

21. The hybrid module of claim 1, wherein the bridge section is configured as a flush grid.

22. The hybrid module of claim 1, wherein the bridge section includes a recess configured to contain a magnet.

23. The hybrid module of claim 1, wherein the bridge section further comprises a magnetic member.

24. The hybrid module of claim 1, wherein the bridge section further comprises a metal member configured to cooperate with windings of a linear motor to move the module.

25. The hybrid module of claim 1, wherein the bridge section further comprises a metal member disposed within the bridge section.

26. The hybrid module of claim 25, wherein the metal member is configured to increase the stiffness of the bridge section along the length of the bridge section.

27. The hybrid module of claim 25, wherein the metal member is configured to increase the toughness of the bridge section.

28. The hybrid module of claim 25, wherein the metal member is configured to protrude beyond an adjacent surface of the bridge section.

29. The hybrid module of claim 1, further comprising an additional bridge section and a central module configured to be coupled between the bridge section and the additional bridge section.

30. The hybrid module of claim 1, wherein the bridge section has a uniform thickness between a leading surface and a trailing surface.

* * * * *